United States Patent [19]

Mehrotra et al.

[11] Patent Number: 5,004,488
[45] Date of Patent: Apr. 2, 1991

[54] PROCESS FOR PRODUCING HIGH PURITY FUSED QUARTZ POWDER

[75] Inventors: Vikram P. Mehrotra; Ray E. Barker, both of Terre Haute, Ind.

[73] Assignee: Pitman-Moore, Inc., Lake Forest, Ill.

[21] Appl. No.: 331,692

[22] Filed: Mar. 20, 1989

[51] Int. Cl.$^5$ ............................................. C03B 20/00
[52] U.S. Cl. ...................................... 65/18.2; 65/18.4; 65/21.5; 264/66; 264/67; 264/117; 264/118; 264/125
[58] Field of Search ...................... 65/18.2, 18.4, 21.4, 65/21.5, 21.1, DIG. 8, 3.12, 3.14, 901, 18.2; 264/60, 61, 66, 109, 117, 118, 121, 122, 123, 125, 140, 144, 67, 80, 81, 82, 114

[56] References Cited

U.S. PATENT DOCUMENTS

| | | | |
|---|---|---|---|
| 1,843,792 | 2/1932 | Thompson | 65/DIG. 8 |
| 1,930,340 | 10/1933 | Ellis et al. | 65/18.4 |
| 2,272,342 | 2/1942 | Hyde | 65/21.5 |
| 2,714,227 | 8/1955 | Graham et al. | 264/114 |
| 2,726,487 | 12/1955 | Cummins et al. | 65/DIG. 8 |
| 3,151,964 | 10/1964 | North | 65/18.1 |
| 3,181,800 | 5/1965 | Noren et al. | 241/24 |
| 3,184,168 | 5/1965 | Feld et al. | 241/39 |
| 3,447,962 | 6/1969 | Megowen | 264/117 |
| 3,497,142 | 2/1970 | Nelson | 241/24 |
| 3,533,756 | 10/1970 | Houseman | 23/294 R |
| 3,535,890 | 10/1970 | Hansen et al. | 65/18.2 |
| 3,565,595 | 2/1971 | Gaskell et al. | 65/21.5 |
| 3,762,936 | 10/1973 | Iler | 65/901 |
| 3,801,294 | 4/1974 | Schultz et al. | 65/18.2 |
| 3,806,570 | 4/1974 | Flamenbaum et al. | 264/66 |
| 3,838,998 | 10/1974 | Matthews et al. | 65/21.2 |
| 3,859,073 | 1/1975 | Schultz | 65/18.2 |
| 3,864,113 | 2/1975 | Dumbaugh, Jr. et al. | 65/3.12 |
| 4,010,242 | 3/1977 | Iler et al. | 423/335 |
| 4,063,916 | 12/1977 | De Vos et al. | 65/21.2 |
| 4,465,656 | 8/1984 | Pastor et al. | 423/339 |
| 4,705,762 | 11/1987 | Ota et al. | 501/87 |
| 4,755,368 | 7/1988 | Ulrich et al. | 423/337 |

FOREIGN PATENT DOCUMENTS

| | | | |
|---|---|---|---|
| 212714 | 3/1987 | European Pat. Off. | 264/117 |
| 54-2654 | 2/1979 | Japan | 65/18.2 |
| 54-71650 | 6/1979 | Japan | 65/18.2 |
| 914513 | 3/1982 | U.S.S.R. | 65/21.1 |

OTHER PUBLICATIONS

Nassau et al., "Plasma Torch Preparation of High Purity, Low OH Content Fused Silica", Ceramic Bulletin, vol. 54, No. 11, pp. 1004-1009 (1975).

Mitchell, "After-Heater Furnace for Verneuil Crystal Growing Technique", pp. 1667-1668.

Morimoto et al., "Spherical Particles and Their Surface Properties. I. Interaction of Water with the Surface of Spherical Silica", Bull. Chem. Soc. Jpn., 53, pp. 26-29 (1980).

Ulrich, "Flame Synthesis of Fine Particles", C&EN, pp. 22-29, Aug. 6, 1984.

*Primary Examiner*—Jan H. Silbaugh
*Assistant Examiner*—Mathieu Vargot
*Attorney, Agent, or Firm*—Wendell R. Guffey; Thomas L. Farquer

[57] ABSTRACT

High purity fused silica particles are made by heating relatively low density silica flour in a high temperature flame. The silica flour feed rate, flame temperature, and collection zone temperature are adjusted to produce an aggregate of surface-bonded fused silica particles. The aggregate is shaped like a honeycomb and can be ground autogenously without introducing impurities into the final product.

11 Claims, 2 Drawing Sheets

PROCESS FOR PRODUCING HIGH PURITY FUSED QUARTZ POWDER

FIELD OF THE INVENTION

The invention relates to a product from and a process for the production of high purity fused silica powder from relatively low density silica particles. The fusion of the silica particles occurs in a flame fusion furnace. The temperature of the flame and feed rate of the silica particles are controlled to produce an aggregate of fused glass particles which are bonded on the surface in such a manner that subsequent grinding thereof is made easier than if the particles had been allowed to completely coalesce during fusion.

BACKGROUND OF THE INVENTION

The industries relating to optical elements and fused quartz crucibles have a continuing need for high purity silica particles as a source of fused quartz. For example, fused quartz or silica crucibles are used for growing silicon crystals which find use in electronic circuits. Necessarily, these crucibles must be of a high purity to ensure pure crystal growth. Silica or quartz that is currently used in the manufacture of fused silica crucibles is a natural quartz of very high purity and is available in only very limited number of places in the world. Its particle size is critical and is controlled between 50 to 150 mesh. From a purity viewpoint, natural quartz has some inherent limitations and ever increasing purity requirements of the electronics and optical industries demand that crucibles be made from purer and purer starting material. Synthetic silica can fill this purity gap. However, commercially available synthetic silica powder is very light, fluffy, fine and generally not suitable for making crucible or other fused quartz products.

Optical elements also must be free of bubbles, color centers and elements which can absorb radiation in undesired regions of the wavelength spectrum.

The requirements for each of the above applications demand that the silica particles to be fused have a relatively high density. If the density is too low, air trapped within the pore structure forms bubbles upon heating the silica particles. These bubbles do not escape due to the high viscosity of the molten glass. Since high density silica feeds reduce bubble formation, there is a need to make dense, high purity, synthetic silica particles of the desired size which can be used for crucible manufacture as well as for other applications in the optical industry. To the knowledge of inventors, there is no known commercial method of making coarse and dense silica powders of purity suitable for above applications.

Many impurities can be introduced during formation of a silica particle. One production method uses a mixture of sodium silicate and either an acid or a base to form a silica gel. This gel is then washed and spray dried to make a dried, relatively low density product. In one variation of the production method, silica gel material may be formed directly into fused silica without an intermediate washing or spray drying. For example, see U.S. Pat. Nos. 4,063,916 and 3,838,998. In another processing technique silicon tetrachloride is hydrolized in a flame and deposited directly on a mandrel or "bait". As an example of such a process, see U.S. Pat. No. 3,806,570. A similar technique can also be applied to a plurality of different types of metal chloride gases. See, U.S. Pat. No. 3,801,294.

Silica particles, known as silica flour, generally have has a particle size of up to about 70 microns. Silica flour particles are amorphous and have a bulk density of only about 0.2 to 0.4 g/cc.

On the other hand, completely fused silica particles provide a glass product having a bulk density of about 2.2 g/cc. One method for producing such completely fused glass from a silica flour uses an electric arc through which the silica flour is dropped. See, U.S. Pat. Nos. 3,151,964 and 3,553,756. This glass product is very hard and is almost impossible to break by thermal shock. These properties make the glass difficult to grind into powder because the particles abrade the grinding elements thereby introducing impurities into the resultant product.

It would be desirable to produce an aggregate of bonded fused glass particles that can be ground in a relatively simple manner without introducing impurities into the ground product.

SUMMARY OF THE INVENTION

It is an object of this invention to provide a process for producing fused silica in a particle form that can be ground to a desired size without introducing impurities.

It is another object to produce a fused silica particle aggregate in a form suitable for such processing. Other objectives will become apparent from the description below.

A process for producing a fused silica particle aggregate in accordance with the invention comprises:

feeding silica flour particles to a heating zone;

heating said silica flour particles in a flame to a temperature sufficient to form fused silica particles from said silica particles, said fused silica particles having a relatively higher bulk density than said silica flour particles;

collecting aggregates of said fused silica particles, said aggregates exhibiting a honeycomb-shaped structure of surface-bonded fused silica particles; and grinding said aggregates into ground silica particles having a desired size.

The honeycomb structure produced by this invention is not very hard, can be readily handled during processing and, thereafter, can be easily ground to the desired particle size without introducing impurities or substantial amount of fines.

DETAILED DESCRIPTION OF THE INVENTION

Figure 1:
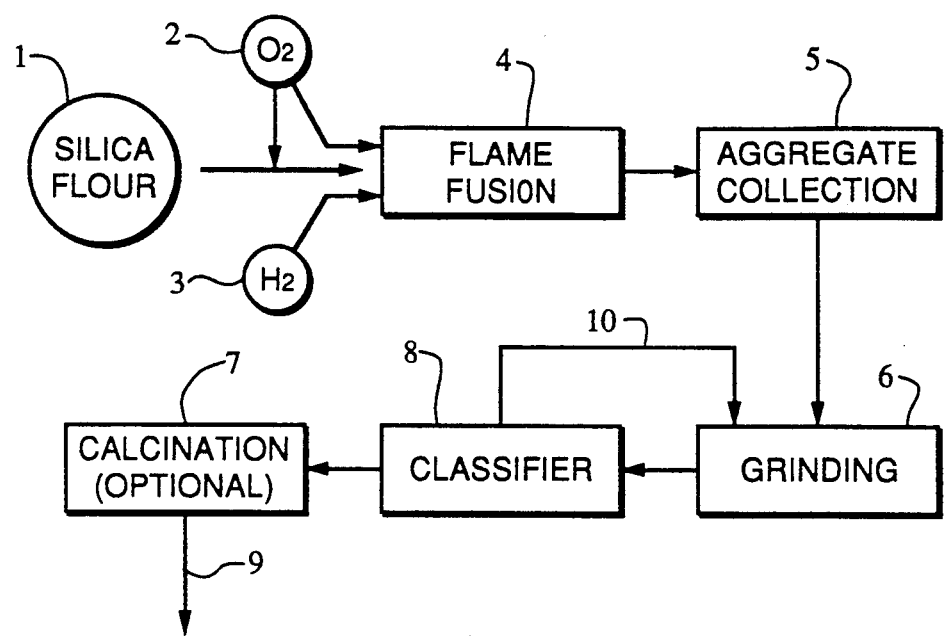
FIG. 1 schematically shows a sequence of steps according to a process of the invention.

The unfused silica particles used as feed for the process of this invention are presented in the form of a high purity silica flour. Flour useful for the present invention may be made by any conventional method with appropriate attention to the presence of metallic impurities. The flour may be entrained in a first stream of oxygen and transported to a flame fusion furnace. Within the furnace, this entrained stream of silica particles contacts a flame made with hydrogen and a second stream of oxygen. The flame temperature is, normally within a range from about 1600° to about 1900° C. Hydrogen pressure can be used to control the flame temperature as appropriate. The silica flour particles will have a residence time in the fusion area on the order of a few milliseconds, but this time can be adjusted to control the size and density of the resulting fused silica aggregates.

Silica flour particles are so small that heat transfer across the diameter is substantially instantaneous. The particles soften and contract as the void structures collapse. This fusion causes the particle density to increase and the gases within the pores to be expelled as the particle volume decreases. The heated particles then collide with one another and begin to aggregate into larger particles.

If heated for too long, the heated particles coalesce into a hard, nonporous body that is difficult to grind. Therefore, the flame temperature and residence times are controlled to produce an aggregate having a form that is best described as a honeycomb-shaped structure of particles that are less than about 25% coalesced, preferably less than about 10% coalesced by volume. The percentage that a particle is coalesced is measured by comparing the coalesced particle volume portion to the initial, undeformed particle volume. Stated mathematically, percent coalesced = (100)(initial volume − individual spherical particle volume remaining as a sphere)/(initial volume).

$$\% = (100)\frac{V_o - V_f}{V_o}$$

The honey-shaped structure according to the invention comprises fused silica particles which are surface bonded to each other in a porous, aggregated structure. Depending on operating conditions, the honeycomb-shaped aggregates will generally have dimensions within a range from about 500 microns to about 4 inches. This aggregate is easier to grind than a mass formed from completely coalesced fused silica particles.

Downstream from the fusion zone is a collection zone. This collection zone is at a temperature much lower than the flame temperature. Generally, the collection zone temperature is within a range from about 1000° to about 1200° C. depending on the temperature of the flame, the collection point distance from the flame, and the structure of the furnace.

One furnace structure constituting an embodiment of the invention uses a collection zone having a larger diameter than the fusion furnace. The furnace and the collection zone are located coaxially so as to form an annular distance between at least the lower portion of the furnace wall and the upper portion of the collection zone wall. Preferably, this annular zone is open to a source of cooling air. This cooling air can be ambient air. Such an arrangement will generate a venturi suction across the annular zone as the gases and heated glass particles pass from the relatively narrow furnace into the relatively larger cooling zone. Ambient air is drawn into the collection zone by the suction forces. This ambient air will act as a cooling stream and cool the hot silica particles thereby terminating the coalescence. Cooled air or other gases may be used in placed of ambient air or pressurized if desired.

The aggregates are collected in the collection zone for later removal and processing. This collection may be as simple as permitting the aggregates to collect on the collection zone wall or on a moveable mandrel which is inserted into the collection zone. Such a mandrel is within a group of collection devices known as "baits". See, U.S. Pat. No. 3,806,570. Mandrels may be of any material (metal, ceramic, graphite, etc.) but are preferably completely fused quartz.

Aggregates collected on a fused quartz mandrel need not be removed from the mandrel prior to grinding. The mandrel containing the attached aggregates is inserted, for example, into an autogenous grinder without intermediate processing. Because the fused quartz mandrel is harder than the aggregates, the mandrels will pass through the grinder generally intact and may be reused. Particles broken from the mandrels have substantially the same composition as the fused silica particles so these fragments do not constitute impurities.

The aggregates must be removed from the mandrel prior to processing if metal mandrels are used. Otherwise, impurities from the mandrel will become mixed with the ground fused silica particles. These impurity particles are very difficult to separate and will decrease the overall purity.

Grinding can be achieved by any type of grinder. The preferred grinder is an autogenous grinder having an abrasion-resistant inner liner. Autogenous grinders use the material to be ground as the grinding media and do not use external grinding materials and, therefore, avoid introducing possible sources of impurity. The abrasion surface of an autogenous grinder may be the feed material itself. See, U.S. Pat. No. 3,497,142.

One exemplary autogenous grinder structure is a lined, rotating cylinder. The cylinder rotates continually with periodic or continuous material removal. Continuous removal can be achieved by entraining the desired particles into a gas stream or gravity discharge. The liner can be polyurethane, plastic, quartz or some other abrasion resistant material. The liner is a potential source of impurities. If an organic liner is used, the ground material discharged from the grinder can be calcined in an oxygen-containing atmosphere within a range from about 500° to about 1000° C. This calcination will remove the organic impurities. Other liner materials should be chosen with considerations for separating and removing the resulting impurities.

After grinding, the fused silica particles are classified to recover particles within a desired size range. Preferably, this size is within the range 100-300 microns. The bulk density of ground particles according to the invention will be within a range from about 0.7 to about 1.2 g/cc. The purity of the final product will depend on the purity of the feed silica and whether impurites were introduced during processing. An autogenous grinder can be operated to avoid the introduction of any contaminants. In that regard, copending application Ser. No. 07/221,025 is cited which is expressly incorporated herein by reference.

The invention may be further understood by reference to the attached drawings. It is not intended that the drawings be used to limit the scope of the invention which is circumscribed solely by the appended claims.

Figure 4:
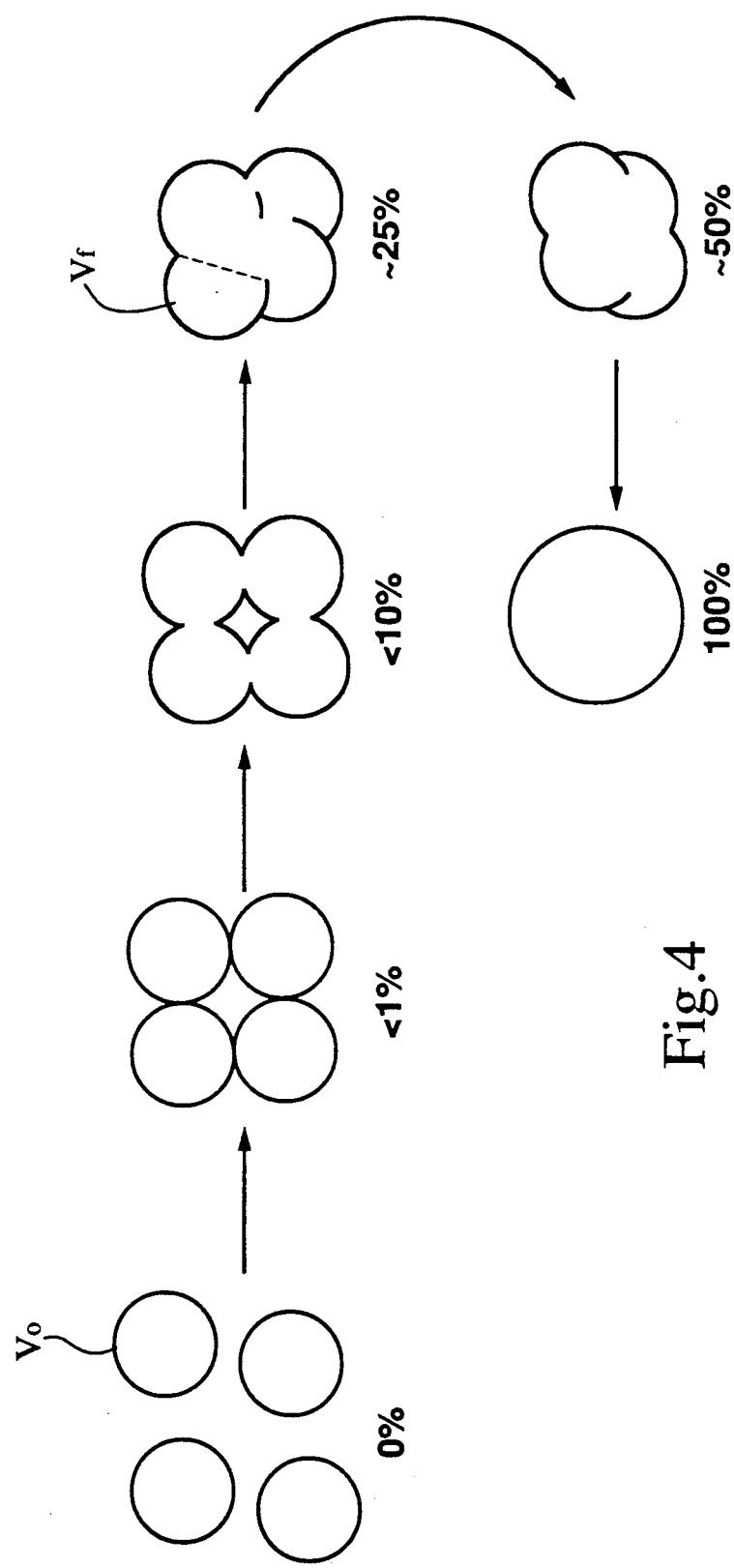
FIG. 4 depicts aggregates of surface bonded silica particles.

With reference to FIG. 1, silica flour particles 1 in the form of a dry flour are entrained in a first stream of oxygen 2 and transported to furnace 4 for heating into fused silica particles. In parallel streams, a second stream of oxygen 2 and a stream of hydrogen 3 are introduced into furnace 4 and reacted to form a high temperature flame in a fusion zone. The entrained stream of silica flour particles 1 is introduced to the center of this high temperature flame. Silica flour particles 1 heat up almost instantaneously, soften, and form discrete fused silica particles of a higher density. These discrete particles will collide with one another and form surface-bonded aggregates of particles that are less than 25%, preferably less than about 10% coalesced by volume (see FIG. 4).

Fused silica particle aggregates exit furnace 4 and are collected in aggregate collection stage 5.

The aggregates are collected and passed to grinding stage 6 for size reduction. Autogenous grinding in a lined grinder is preferred to maintain the purity of the fused silica particles. An organic liner assures that any materials introduced into the ground material can be removed such as by calcining. Optional calciner 7 at 500°–1000° C. will burn off organic contaminants that may be present in the final material.

Size classifier 8 separates the particles of desired size 9 from oversized and undersized particles. Large particles and aggregates may be returned via recycle line 10 to grinding stage 6 for further size reduction.

Figure 2:
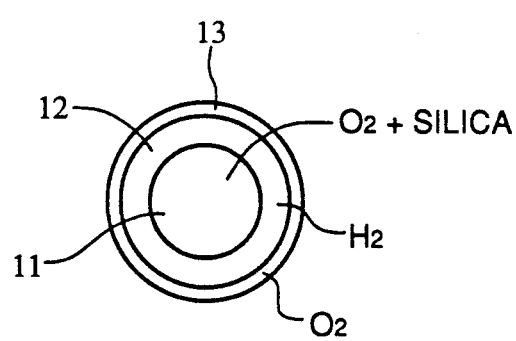
FIG. 2 illustrates a concentric feed arrangement to a fusion furnace.

FIG. 2 illustrates a concentric feed arrangement for fusion furnace 4. Silica flour particles entrained in first stream of oxygen 2 are introduced into center 11 of a concentrically fed flame. Hydrogen 3 is presented to the flame from first annular passage 12. Because the hydrogen is completely converted in the flame, its flow rate can be used to control the flame temperature. The second stream of oxygen 2 is fed to the flame in outermost annular passage 13.

Figure 3:
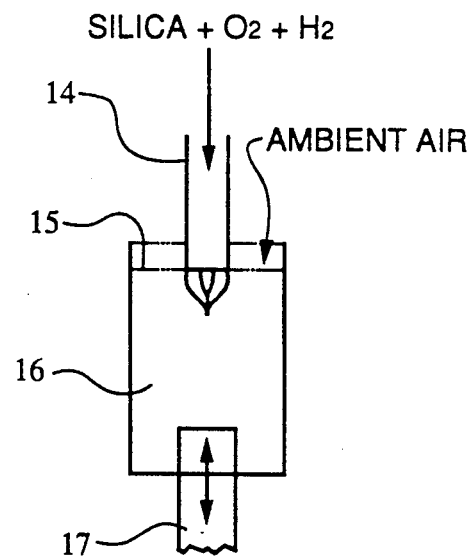
FIG. 3 depicts the furnace and collection chambers in an arrangement which forms a venturi intake for ambient cooling air.

FIG. 3 shows a side view of a fusion zone burner 14 coaxially disposed above collection zone 16. As depicted, both burner 14 and collection zone 16 are cylindrical with different diameters. This difference will form annular area 15 between the stages. This annular area will be subjected to a venturi suction as the gases and glass particles pass through the flame and into the collection zone. Preferably, annular area 15 is open to the relatively cooler ambient air. The air taken in will cool the heated and aggregating particles quickly and without the need for a pressurized cooling gas line. Such a line may be used instead of or in addition to a venturi intake, though. Appropriate cooling means will be determined by the particular apparatus used, the flame temperature, and the silica flour feed rate. Typically, the flame temperature should be within a range from about 1600 to about 1900° C. with a cooling stage temperature within a range from about 1000 to about 1200° C. The cooling stage may be used at a lower temperature so long as the aggregates according to the invention are produced. Mandrel 17 may be moved into collection zone 16 as needed for collection.

EXAMPLE

Silica flour with the analysis shown in Table 1 was flame fused in an apparatus sketched in FIGS. 2 and 3. Silica flour was fed at 6.5 grams/min in a $O_2$ carrier gas flow of 1.5 liters/min. Hydrogen and oxygen were fed as shown in FIG. 2 at 26 and 15 liters/min, respectively.

The fused silica particle aggregates were allowed to form on the walls of the collection zone (16 in FIG. 3) without the benefit of a mandrel. The fused, unaggregated silica was collected in a crucible below the aggregate collection zone. When aggregates became large enough to interfere with the flame in the collection zone, they were broken with a quartz rod and allowed to fall into the powder collection crucible.

After seven hours of operation the aggregates were manually separated from the fused powder, yielding 261 grams of aggregates and 2089 grams of fused powder.

The fused silica aggregates (+50 mesh) were ground in an autogenous mill to produce 50×150 mesh size fused silica powder. Specifically, 261 grams of aggregated fused quartz were placed in a 9" O.D. ×12" height polyurethane-lined mill (Manufacturer: Paul O. Abbe, Inc., Little Falls, N.J.) and tumbled for approximately 3 hours at 85% of its critical speed. Mill contents were then manually screened using plastic screens to collect +50, 50×150 and −150 mesh fractions. The following size distribution was obtained.

|       | 50   | 50 × 150 | −150 | Handling Loss |
|-------|------|----------|------|---------------|
| Wt. % | 28.7 | 45.1     | 23.3 | 3             |

The 50×150 mesh fraction which is of most commercial interest was analyzed for impurities. As the analysis of the final product (Table 1) shows, the purity of the feed silica powder was maintained throughout the fusion, grinding and other associated unit operations.

TABLE 1

| Chemical Analyses of Silica Feed and 50 × 150 Mesh Fused Silica Product | | |
|---|---|---|
|  | Silica Feed (ppm) | 50 × 150 Fused Silica (ppm) |
| Al | 0.83 | 1.30 |
| Ca | 0.60 | 0.70 |
| Cr | 0.08 | 0.05 |
| Cu | 1.15 | 0.83 |
| Fe | 4.74 | 5.13 |
| Mg | 0.31 | 0.24 |
| Mn | 0.09 | 0.03 |
| Ni | 0.05 | 0.06 |
| P | 0.47 | 1.60 |
| S | 0.19 | 0.29 |
| Zn | 0.05 | 0.13 |
| Na | 0.2 | 0.6 |
| K | 0.2 | 0.2 |
| Ba, Cd, Co, Mo & Sr | 0.05 (each) | 0.05 (each) |

Obviously, the process and aggregates of the invention are not intended to be limited by the fusion apparatus described and illustrated. The figures are not drawn to scale and are to be used solely to aid in an understanding of the principles involved.

We claim:

1. A process for converting low density silica flour particles into high density fused silica particles of high purity, said process comprising:
    feeding silica flour particles to a heating zone;
    heating said silica flour particles in a flame to a temperature sufficient to form fused silica particles from said silica flour particles, said fused silica particles having a relatively higher bulk density than said silica flour particles;
    controlling the flame temperature and the residence time of said silica flour particles in said flame to collect aggregates of said fused silica particles which exhibit a honeycomb-shaped structure that is surface bonded and less than 25% coalesced to facilitate a subsequent grinding step;
    grinding said aggregates into ground fused silica particles.

2. A process according to claim 1 further comprising:

separating said ground fused silica particles by particle size into particles having a desired size range and oversized particles; and recycling said oversized particles for further grinding.

3. A process according to claim 1 wherein the grinding comprises autogenous grinding.

4. A process according to claim 3 wherein the autogenous grinding comprises:

tumbling said aggregates in a rotating cylinder lined with an abrasion resistant material; and discharging ground material.

5. A process according to claim 4 further comprising:

removing abrasion resistant material mixed with ground fused silica particles discharged from said grinder.

6. A process according to claim 5 wherein the removing comprises calcining at a temperature within a range from about 500° to about 1000° C.

7. A process according to claim 1 comprising collecting said aggregates on a mandrel or bait.

8. A process according to claim 7 wherein the mandrel or bait consists of fused silica.

9. A process according to claim 8 further comprising:

feeding the mandrel or bait on which fused silica particle aggregates are disposed to a grinder without separating said aggregates from the mandrel or bait.

10. A process according to claim 1 further comprising:

adjusting a collection zone temperature to produce said aggregate.

11. A process for converting low density silica flour particles into high density silica particles of high purity, said process comprising:

feeding silica flour particles to a heating zone;

heating said silica flour particles in a flame to a temperature sufficient to form fused silica particles from said silica flour particles, said fused silica particles having a higher bulk density than said silica flour particles and colliding with one another and forming porous aggregates of surface bonded fused silica particles that are less than 10% coalesced;

passing said aggregates to a collection zone disposed coaxially with said heating zone and forming an annular zone around said heating zone that is open to a source of cooling air and drawing in cooling air through said annular zone as said aggregates pass from said heating zone into said cooling zone;

collecting said aggregates; and grinding said aggregates into ground, fused, silica particles.

* * * * *